(12) United States Patent
Fallarero et al.

(10) Patent No.: US 11,397,148 B2
(45) Date of Patent: Jul. 26, 2022

(54) METHOD OF ANALYZING LIQUID SAMPLES, MICROPLATE READER AND COMPUTER PROGRAM

(71) Applicant: Life Technologies Holdings PTE LTD, Singapore (SG)

(72) Inventors: Adyary Fallarero, Vantaa (FI); Marika J. Raitio, Helsinki (FI); Tommi Suvanto, Espoo (FI); Katja Eklin, Espoo (FI)

(*) Notice: Subject to any disclaimer, the term of this patent is extended or adjusted under 35 U.S.C. 154(b) by 137 days.

(21) Appl. No.: 16/625,502

(22) PCT Filed: Jun. 27, 2018

(86) PCT No.: PCT/FI2018/050512
§ 371 (c)(1),
(2) Date: Dec. 20, 2019

(87) PCT Pub. No.: WO2019/002689
PCT Pub. Date: Jan. 31, 2019

(65) Prior Publication Data
US 2021/0333198 A1    Oct. 28, 2021

(30) Foreign Application Priority Data
Jun. 27, 2017  (FI) .................................... 20175606

(51) Int. Cl.
*G01N 21/25*     (2006.01)
(52) U.S. Cl.
CPC ... *G01N 21/253* (2013.01); *G01N 2201/0446* (2013.01)
(58) Field of Classification Search
CPC ........ G01J 3/02; G01J 3/0229; G01N 21/253; G01N 21/0332; G01N 2201/0627; G01N 2201/0446
(Continued)

(56) References Cited

U.S. PATENT DOCUMENTS

| 4,892,409 A | 1/1990 | Smith |
| 5,784,152 A | 7/1998 | Heffelfinger et al. |

(Continued)

FOREIGN PATENT DOCUMENTS

| CN | 1668913 A | 9/2005 |
| CN | 102854307 A | 11/2014 |

(Continued)

OTHER PUBLICATIONS

International Search Report and Written Opinion dated Sep. 27, 2018, issued in PCT Application No. PCT/FI2018/050512, filed Jun. 27, 2018.

(Continued)

*Primary Examiner* — Isiaka O Akanbi
(74) *Attorney, Agent, or Firm* — Workman Nydegger; Logan Christenson; John Guynn

(57) ABSTRACT

The method of analyzing absorbance of one or more liquid samples arranged in the wells of a microplate includes the steps of setting a desired wavelength falling within the wavelength range of 380 nm-750 nm for absorbance measurement, illuminating the samples using electromagnetic radiation having a bandwidth of at most 20 nm around the set wavelength, measuring radiant flux transmitted through each sample, on the basis of measured radiant flux values, determining an absorbance value for each sample, and visualizing the absorbance values on a display as a matrix comprising a plurality of cells, each cell corresponding to a well of the microplate. The set wavelength is used as an input for determining the visual properties of the cells.

15 Claims, 8 Drawing Sheets

(58) Field of Classification Search
USPC ....... 356/319, 300, 328, 318, 420, 416, 432, 356/419
See application file for complete search history.

(56) References Cited

U.S. PATENT DOCUMENTS

| | | | |
|---|---|---|---|
| 6,466,316 B2 * | 10/2002 | Modlin | G01N 21/253 356/417 |
| 7,733,488 B1 * | 6/2010 | Johnson | G01J 3/02 356/414 |
| 2001/0003044 A1 * | 6/2001 | Modlin | G01N 21/645 435/7.1 |
| 2005/0107957 A1 | 5/2005 | Heath et al. | |
| 2006/0227320 A1 | 10/2006 | Eiichi et al. | |
| 2011/0251080 A1 * | 10/2011 | Tuunanen | G01N 21/6428 435/6.12 |
| 2013/0203173 A1 | 8/2013 | Tikanoja et al. | |
| 2014/0160466 A1 * | 6/2014 | Muller | G01N 21/253 356/72 |
| 2014/0320513 A1 * | 10/2014 | Ogi | G06V 20/695 345/581 |
| 2016/0011048 A1 | 1/2016 | Niggl et al. | |
| 2016/0313255 A1 * | 10/2016 | Pardee | G01N 21/6452 |
| 2017/0333895 A1 * | 11/2017 | Collins | G01N 21/253 |
| 2018/0196193 A1 * | 7/2018 | Ozcan | G02B 6/06 |

FOREIGN PATENT DOCUMENTS

| | | |
|---|---|---|
| CN | 104870977 A | 8/2015 |
| CN | 106599608 A | 4/2017 |
| JP | 2007-512816 A | 5/2007 |
| JP | 2014-207647 A | 10/2014 |
| JP | 2016-061603 A | 4/2016 |
| JP | 2017-067605 A | 4/2017 |
| WO | 2016/065115 A1 | 4/2016 |
| WO | 2016/205736 A1 | 12/2016 |

OTHER PUBLICATIONS

Finnish Search Report dated Mar. 6, 2018, issued in Finnish Application No. 20175606.

* cited by examiner

METHOD OF ANALYZING LIQUID SAMPLES, MICROPLATE READER AND COMPUTER PROGRAM

TECHNICAL FIELD OF THE INVENTION

The present invention relates to a method of analyzing liquid samples in accordance with claim 1. The invention also concerns a microplate reader and a computer program for operating a microplate reader as defined in the other independent claims.

BACKGROUND OF THE INVENTION

A microplate (also called e.g. as a microtiter plate, microwell plate, multiwell plate or multiwell) is a flat plate comprising a plurality of wells, i.e. cavities that are arranged in rows and columns. The wells are configured to receive samples and function as small test tubes. A typical microplate comprises 6, 24, 96, 384 or 1536 wells, although also larger microplates exist. The wells are arranged in a rectangular matrix, where the ratio between the sides is typically 2:3. The samples are usually liquid, but microplates can also be used for example for samples that are in the form of powder. The microplates are typically made of a plastic material. The plates may be clear, opaque or colored, for example white or black. However, all microplates are not necessarily suitable for all applications.

Microplates are widely used in life sciences. Samples are placed in the wells of the microplates and analyzed with a microplate reader. A microplate reader can detect biological, chemical or physical events of the samples in the microplate. The microplate readers can be based on different phenomena, such as fluorescence or luminescence. One common technology for analyzing samples is the use of absorbance detection, which can be used for many different kinds of assays. In absorbance detection, the absorbance (optical density) of a colored sample is measured using a spectrophotometer. The change of color in a sample correlates with some biological, chemical or physical change in the sample. Absorbance-based assays are popular, among other reasons, because of the visible change of color in the sample. However, in the existing microplate readers the change of color is not fully reflected in the results displayed by the user interface of the microplate reader, which makes further analysis of the results more difficult.

SUMMARY OF THE INVENTION

An object of the present invention is to provide an improved method of analyzing absorbance of one or more liquid samples arranged in the wells of a microplate. The characterizing features of the method according to the invention are given in claim 1. Another object of the invention is to provide an improved microplate reader. Still another object of the invention is to provide an improved computer program for operating a microplate reader.

The method according to the invention comprises the steps of setting a desired wavelength falling within the wavelength range of 380 nm-750 nm for absorbance measurement, illuminating the samples using electromagnetic radiation having a bandwidth of at most 20 nm around the set wavelength, measuring radiant flux transmitted through each sample, on the basis of measured radiant flux values, determining an absorbance value for each sample, and visualizing the absorbance values on a display as a matrix comprising a plurality of cells, each cell corresponding to a well of the microplate, wherein the set wavelength is used as an input for determining the visual properties of the cells.

By using the set wavelength as an input for determining the visual properties of the cells, the result matrix can be configured to better resemble the set of samples in the microplate and the user of the method can interpret the results more reliably. This is particularly important and useful when a large number of samples are analyzed. For instance, if microplates with a large number of wells are used, such as microplates having at least 384 wells, the results cannot be easily shown as numerical values in the limited space of a user interface. The use of the set wavelength as an input for determining the visual properties of the cells allows larger amounts of data to be shown on a display at a time and a user of a microplate reader can quickly detect whether the results look reliable and can either repeat the analysis with corrected parameters or move to analyzing a next set of samples.

According to an embodiment of the invention, the color of each cell is selected so that the color corresponds to the color of the sample as perceived by the human eye. The color of each cell is thus the complementary color of the color corresponding to the wavelength set for the absorbance measurement.

According to an embodiment of the invention, the color is selected from an RGB or ARGB color space.

According to an embodiment of the invention, the bandwidth of the electromagnetic radiation used for illuminating the samples is at most 10 nm. According to another embodiment of the invention, the bandwidth is at most 2.5 nm.

According to an embodiment of the invention, the set wavelength is within 20 nm from a local absorbance maximum of the sample. It is often desirable to measure absorbance values using electromagnetic radiation having a wavelength that is close to a wavelength at which a local absorbance maximum takes place.

According to an embodiment of the invention, the set wavelength is within 10 nm from a local absorbance maximum of the sample. According to another embodiment of the invention, the set wavelength is within 2.5 nm from a local absorbance maximum of the sample. According to another embodiment of the invention, the set wavelength corresponds to the local absorbance maximum.

According to an embodiment of the invention, the method comprises the step of determining a local absorbance maximum of a sample, and the wavelength is set on the basis of the determined local absorbance maximum. The process of determining the local absorbance maximum and/or setting the wavelength can be automatic.

According to an embodiment of the invention, the local absorbance maximum is determined by illuminating at least one sample using electromagnetic radiation with different wavelengths or wavelength ranges, measuring radiant fluxes transmitted through the sample, and determining absorbance values for different wavelengths or wavelength ranges.

According to an embodiment of the invention, the determined absorbance value of each sample is used as an input for determining the transparency of the respective cell on the display. Since the transparency of each cell correlates with the absorbance value, the user can easily spot the interesting samples.

According to an embodiment of the invention, the transparencies of the cells are set by means of alpha blending and the alpha channel values of the cells have a positive correlation with the absorbance values. The samples with higher absorbance values are thus shown as less transparent cells on the display.

According to an embodiment of the invention, at least one cell is bordered with a frame having a color corresponding to a wavelength, which is within 20 nm of the set wavelength. The color can be within 10 nm of the set wavelength. The color can correspond to the set wavelength. The frame color is thus the complementary color of the color of the cell. The frames can be used for example for highlighting the cells with the highest and/or lowest absorbance values. The use of the complementary color allows more reliable interpretation of results.

According to an embodiment of the invention, two or more absorbance measurements are carried out at predetermined time intervals and the measurement data is shown in a time-resolved heat map view.

The microplate reader according to the invention is configured to implement the method defined above.

According to an embodiment of the invention, the microplate reader comprises input means for allowing a user to manually change the color hue used in the visualization of the absorbance values to better match the visualization with the actual visual image of the samples.

The computer program according to the invention comprises instructions which, when the program is executed by a computer, cause a microplate reader to carry out the method defined above.

BRIEF DESCRIPTION OF THE DRAWINGS

Embodiments of the invention are described below in more detail with reference to the accompanying drawings, in which.

DESCRIPTION OF EMBODIMENTS OF THE INVENTION

Figure 1:
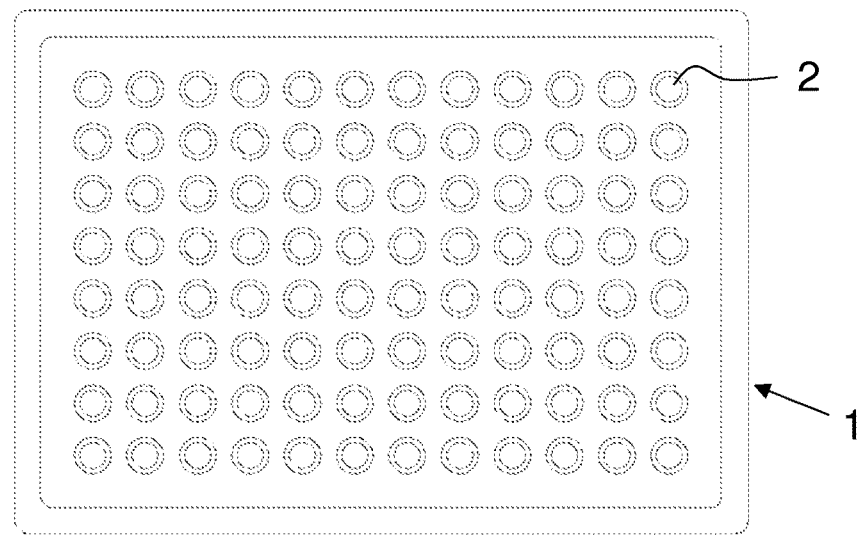
FIG. 1 shows an example of a microplate.

Microplates are widely used in life sciences. FIG. 1 shows an example of a microplate 1. The microplate comprises a plurality of wells 2, i.e. cavities that are arranged in rows and columns. The wells 2 are configured to receive samples and function as small test tubes. The microplate 1 of FIG. 1 comprises 96 wells arranged in 8 rows and 12 columns. Other common sizes of microplates 1 comprise 6, 24, 384 or 1536 wells, but also other sizes are available. The ratio between the sides is typically 2:3. The samples are usually liquid, but microplates 1 can also be used for samples that are in the form of powder or in other forms.

The samples placed in the wells 2 of a microplate 1 can be analyzed using a microplate reader. A microplate reader can detect biological, chemical or physical events of the samples in the microplate 1. The microplate readers can be based on different phenomena, such as fluorescence or luminescence. One common technology for analyzing samples is the use of absorbance detection, which can be used for many different kinds of assays. In absorbance detection, the absorbance (optical density) of a colored sample is measured using a spectrophotometer. A change in color hue or intensity in a sample correlates with some biological, chemical or physical change in the sample. Absorbance-based assays are popular because of the visible change in the color of a sample.

Figure 2:
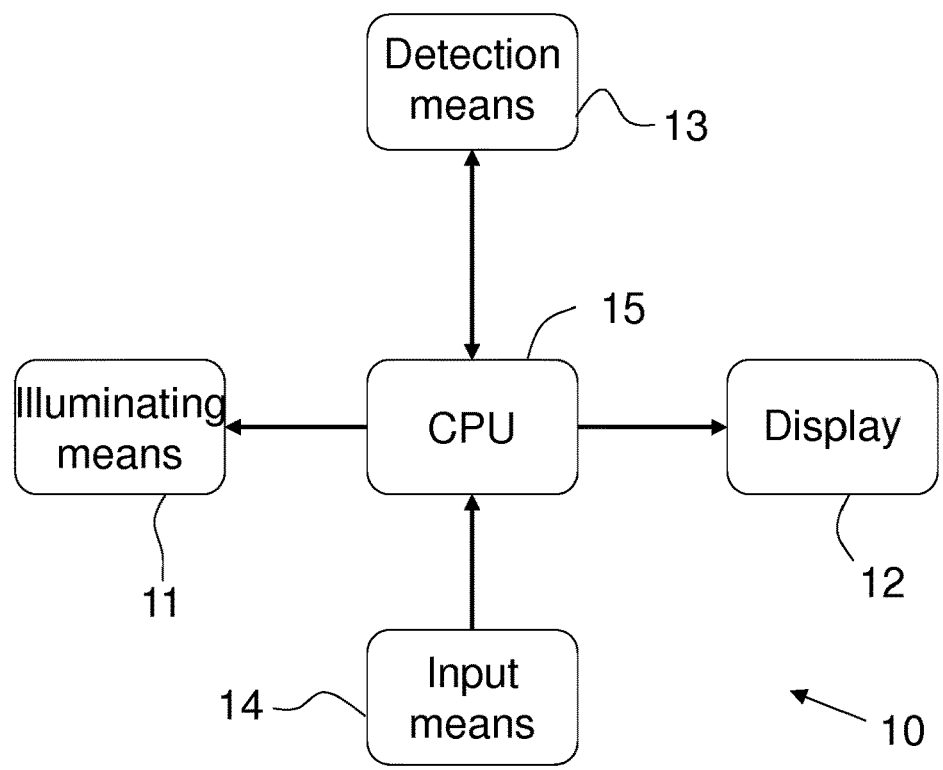
FIG. 2 shows the main elements of a microplate reader.

FIG. 2 schematically shows the main components of a microplate reader 10, which can be used for absorbance-based assays. The microplate reader 10 can be used for analyzing samples arranged in the wells 2 of a microplate 1. Microplates 1 used in absorbance-based assays are typically clear. The microplate reader 10 is configured to determine absorbance values of the samples. The microplate reader 10 comprises illuminating means 11, which are capable of producing electromagnetic radiation with a specific wavelength or wavelength range. The electromagnetic radiation can be visible light (wavelength range approximately 380-750 nm), ultraviolet light (10-380 nm) or infrared light (750 nm-1 mm). The illuminating means 11 are configured to illuminate the samples in the wells 2 of the microplate 1.

The microplate reader 10 further comprises detection means 13. The detection means 13 are configured to measure the radiant flux transmitted through the samples in the wells 2 of the microplate 1. The microplate reader 10 is controlled via input means 14. The input means 14 can comprise, for instance, operating buttons, a keyboard and/or a touch display. Via the input means 14, the user of the microplate reader 10 can control the operation of the microplate reader 10, adjust parameters, and/or change settings of the microplate reader 10. The results of the analysis can be displayed on a display 12. The display 12 can be an integral part of the microplate reader 10 or an external display connected to the microplate reader 10. The input means 14, illuminating means 11, detection means 13 and display 12 communicate with a central processing unit (CPU) 15. The input means 14 and the display 12 do not need to be connected directly to the CPU 15. The microplate reader 10 could also be controlled via software that is installed on an external general-purpose computer, such as a PC. The input means 14 could thus comprise for example a keyboard that is connected to the external computer. Also the display 12 could be connected to the external computer. All the connections may be implemented by wire or by any wireless means and the external computer may be a remote server or a cloud server.

Figure 3:
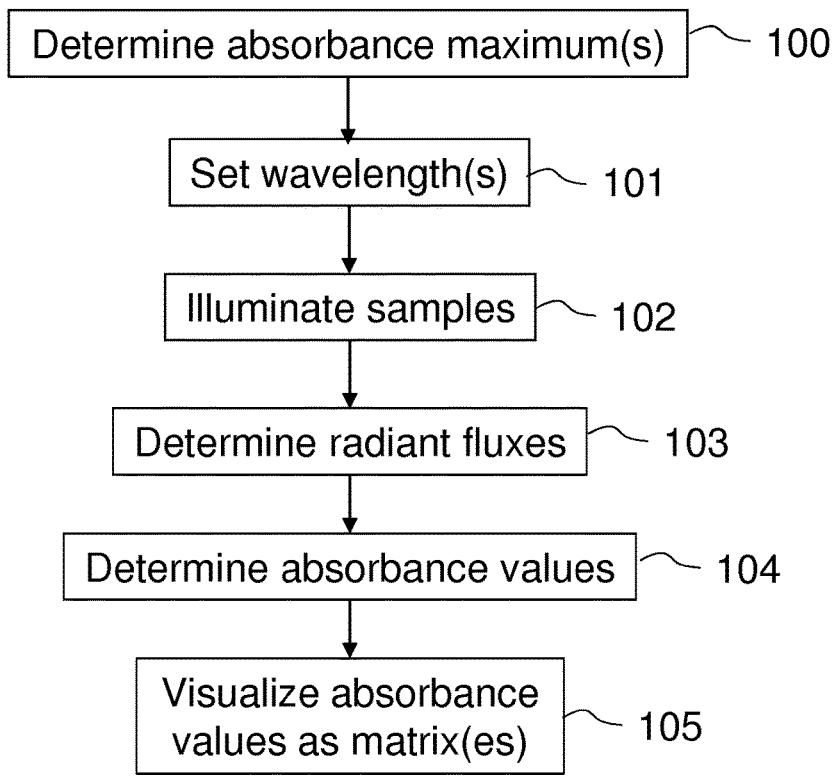
FIG. 3 shows the method according to the invention as a flowchart.

The operation of the microplate reader 10 is shown as a flowchart in FIG. 3. In a first step of the operation, a desired wavelength is set 101. The set wavelength is used in a second step of the operation for illuminating samples placed in the wells 2 of a microplate 1 102. The user can select the desired wavelength via the input means 14. Typically an exact wavelength is selected by the user, but in practice the microplate reader 10 is capable of producing electromagnetic radiation with a certain bandwidth. A narrow bandwidth is usually preferred. The acceptable bandwidth depends on the application. In some cases, a bandwidth of 20 nm is sufficient. In some applications, the bandwidth should be at most 10 nm. In some applications, the bandwidth should not exceed 2.5 nm.

The selection of the wavelength that is used for illuminating the samples is usually based on the wavelength at which an absorbance maximum takes place. The expression "absorbance maximum" refers to a wavelength of electromagnetic radiation, at which there is a peak in the absorbance values, i.e. at which wavelength less radiation is passed through the samples than at the adjacent wavelengths. The samples can have several local absorbance maximums. For instance, local absorbance maximums can be found in the wavelength ranges of ultraviolet light, visible light and infrared light. It is also possible that there are several local absorbance maximums in the wavelength range of visible light. The selected wavelength typically corresponds to a local absorbance maximum or is at least close to the local absorbance maximum. For instance, the selected wavelength can be within 20 nm of the local absorbance maximum. According to an embodiment of the invention, the selected wavelength is within 10 nm of the local absorbance maximum. According to an embodiment of the invention, the selected wavelength is within 2.5 nm of the local absorbance maximum. If a certain wavelength range for illuminating the samples is selected, the wavelength range preferably envelops the local absorbance maximum. If the user knows where a local absorbance maximum takes place, the desired wavelength or wavelength range can be set by the user. The microplate reader 10 can also be configured to determine the absorbance maximum. The wavelength for the absorbance measurements can then be set automatically by the microplate reader 10. Alternatively, the microplate reader 10 can suggest a certain wavelength, which can then be confirmed by the user. It is also possible that the wavelength of the absorbance maximum is only shown to the user, who can then set the wavelength for absorbance measurements manually.

In the embodiment of FIG. 3, the method comprises a preliminary step 100, in which a local absorbance maximum of the samples is determined. However, this step is not necessary, but often the absorbance maximums are known, in which case the user can set the wavelength for the absorbance measurements based on prior knowledge.

In the second step of the operation, the samples placed in the wells 2 of the microplate 1 are illuminated with electromagnetic radiation having a specific wavelength or wavelength range 102.

In a third step of the operation, the detection means 13 are used for determining radiant fluxes transmitted through the samples 103.

In a fourth step of the operation, absorbance values of the samples are determined 104. The absorbance of a material is commonly defined to be the common logarithm of the ratio of incident to transmitted radiant power through the material. The absorbance can thus be expressed by the following equation:

$$A = \log_{10}\left(\frac{P_0}{P}\right), \quad (1)$$

where
$P_0$ is the radiant flux received by the sample, and
P is the radiant flux transmitted by the sample.

The absorbance is dimensionless.

The absorbance values are determined for a certain wavelength of electromagnetic radiation. The wavelength used is typically the wavelength where a local absorption maximum of the sample is known to take place. If the wavelength of the absorption maximum is known, the wavelength or wavelength range used for illuminating the samples can be selected by the user. Alternatively, the microplate reader 10 can be used for carrying out a spectral analysis that determines the absorbance values over the whole operating range or part of the operating range of the microplate reader 10. The measured absorbance values can correlate to the amount of certain cellular metabolites or certain biological functions, such as cellular respiration, membrane integrity, or the activity of a specific enzyme (i.e. lactase dehydrogenase) or other proteins present in the sample.

In a fifth step of the operation, the determined absorbance values are visualized as a matrix 105. The results of the analysis are shown on the display 12.

Figure 4:
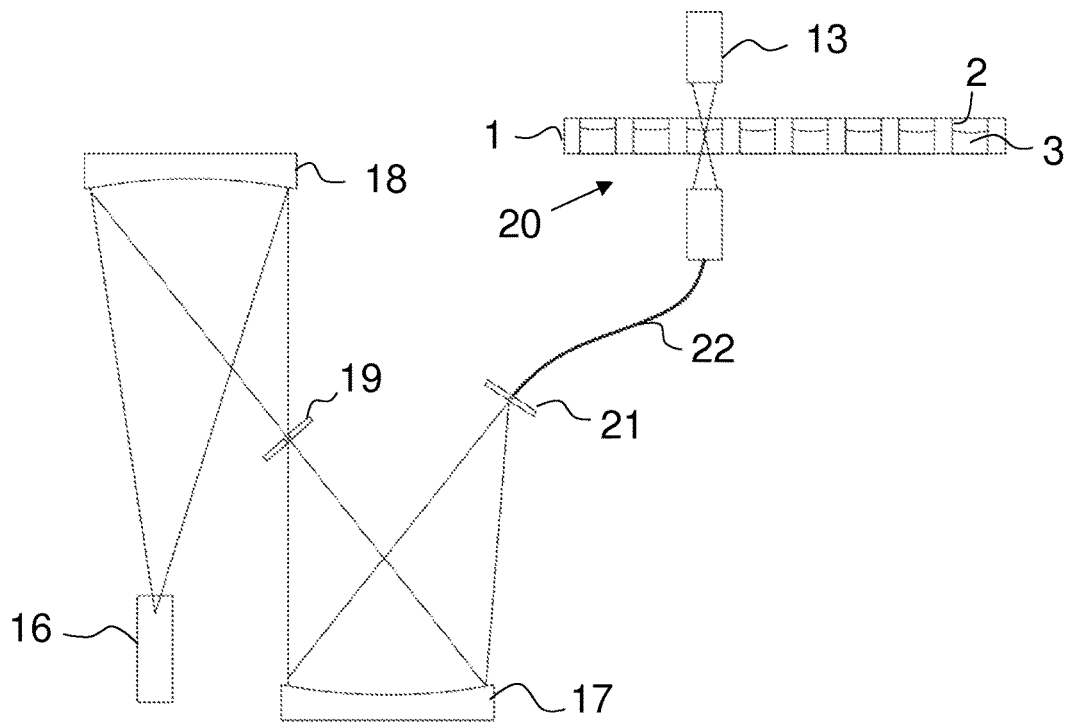
FIG. 4 shows a schematic view of a spectrophotometer.

FIG. 4 shows in more detail an example of a microplate reader 10. In the embodiment of FIG. 4, the illuminating means 11 comprise a light source 16. The light source 16 can be, for instance, a Xenon flash lamp. The light source 16 could also be, for instance, a quartz-halogen lamp. The light source 16 produces electromagnetic radiation, such as visible light (wavelength range approximately 380-750 nm), ultraviolet light (10-380 nm) or infrared light (750 nm-1 mm) with a broad spectrum. For selecting a specific wavelength, the illuminating means 11 further comprise a monochromator 17. The monochromator 17 produces a light beam with a narrow bandwidth. According to an embodiment of the invention, the bandwidth of the light after the monochromator 17 is less than 2.5 nm. However, in some applications also a broader bandwidth is sufficient. Instead of a monochromator, also an interference filter could be used as means for wavelength selection. The light source could also be a narrow band light source, such as a LED or a laser. In that case, a monochromator, interference filter or other external means for wavelength selection may not be needed.

The light beam from the light source 16 is transmitted via optics of the microplate reader 10 to the monochromator 17. In the embodiment of FIG. 4, the optics between the light source 16 and the monochromator 12 comprises a mirror 18 and an entrance slit 19. However, the optics of the microplate reader 10 can be constructed in many different ways.

In the example of FIG. 4, the light is transmitted from the monochromator 17 to a reading station 20 via an exit slit 21 and an optical fiber 22. The light is passed through the samples 3 that are placed in the wells 2 of the microplate 1. The intensity of the light that is passed through the samples 3 is measured by means of a detector 13, such as a silicon photodiode or a photomultiplier tube. In the example of FIG. 4, the detector 13 is moved from one sample 3 to another. However, the microplate reader 10 could comprise several detectors 13 for allowing several samples 3 to be measured simultaneously.

Figure 5B:
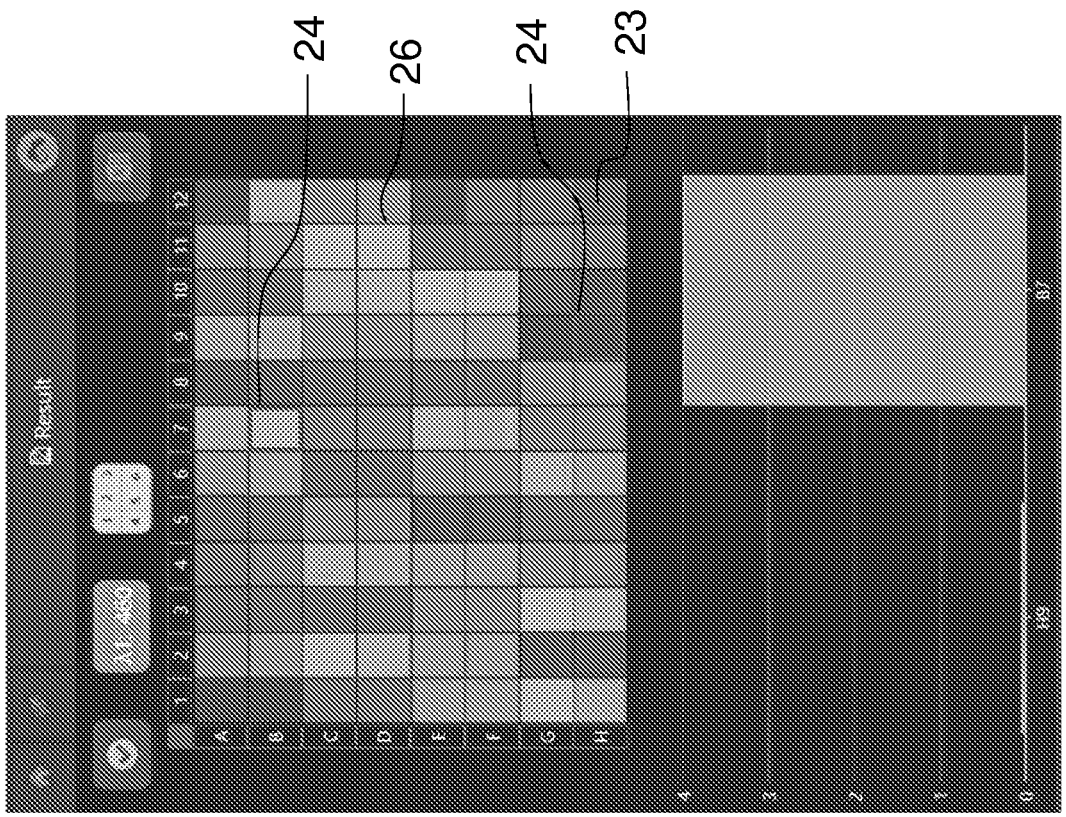
FIGS. 5a and 5b show examples of result matrixes.
Figure 5A:
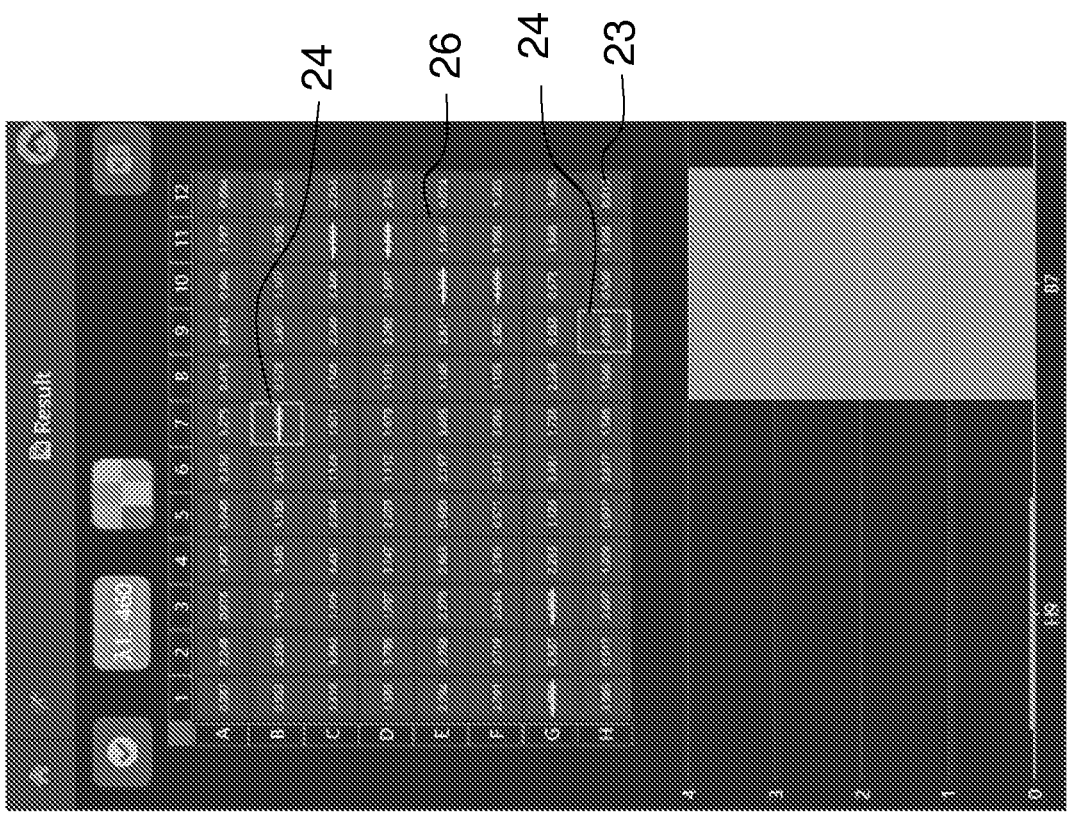
Figure 5C:
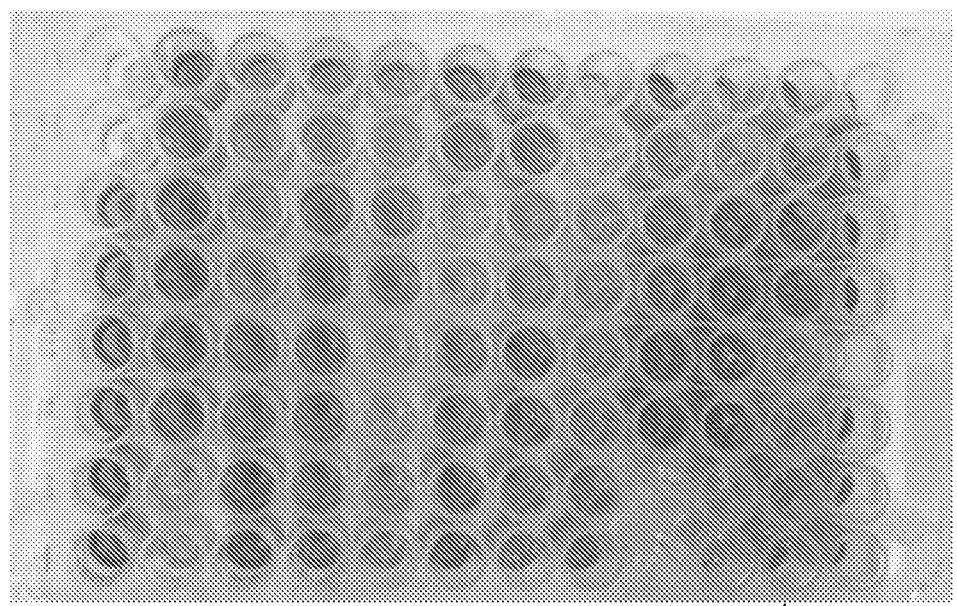
FIG. 5c shows a microplate corresponding to the result matrixes of FIGS. 5a and 5b.

FIGS. 5a and 5b show examples of result views of the microplate reader 10. A corresponding microplate 1 is shown in FIG. 5c. FIG. 5a shows a result view where the absorbance values are shown as numerical values, which typically fall in the range between 0 and 4. The absorbance values are shown on the display 12 as a matrix which comprises a number of cells 23. Each cell 23 of the matrix corresponds to a well 2 of the microplate 1. Since the number of wells 2 of a microplate 1 and the corresponding number of cells 23 in the matrix is large, it may be difficult to quickly detect the absorbance values of interest, for example low and high values. Therefore, the cells 23 with the highest and lowest absorbance values are automatically highlighted by surrounding the cells 23 with a frame 24.

For allowing the user to quickly detect those cells 23 that show particularly low or high absorbance values, the data can also be visualized using a heat map, where the individual values are presented as colors. FIG. 5b shows an example of a heat map. The user of the microplate reader 10 can switch between the different views or choose to show them simultaneously.

Figure 10B:
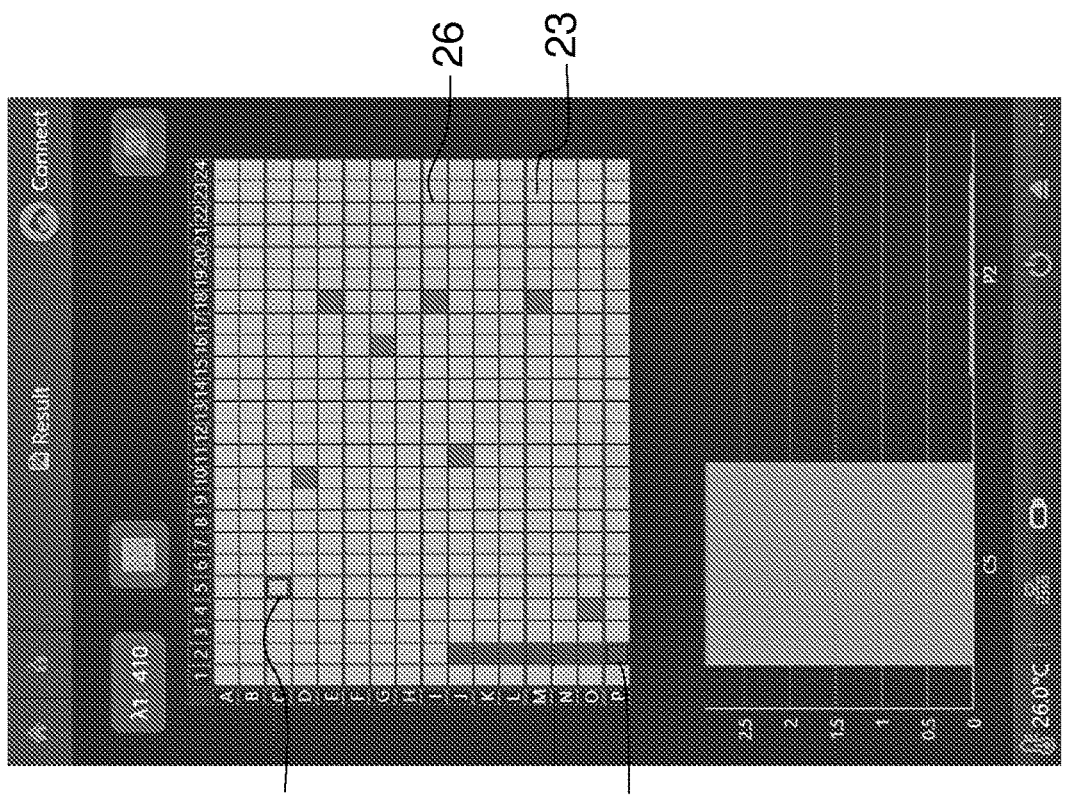
FIGS. 10a and 10b show further examples of result matrixes.
Figure 10A:
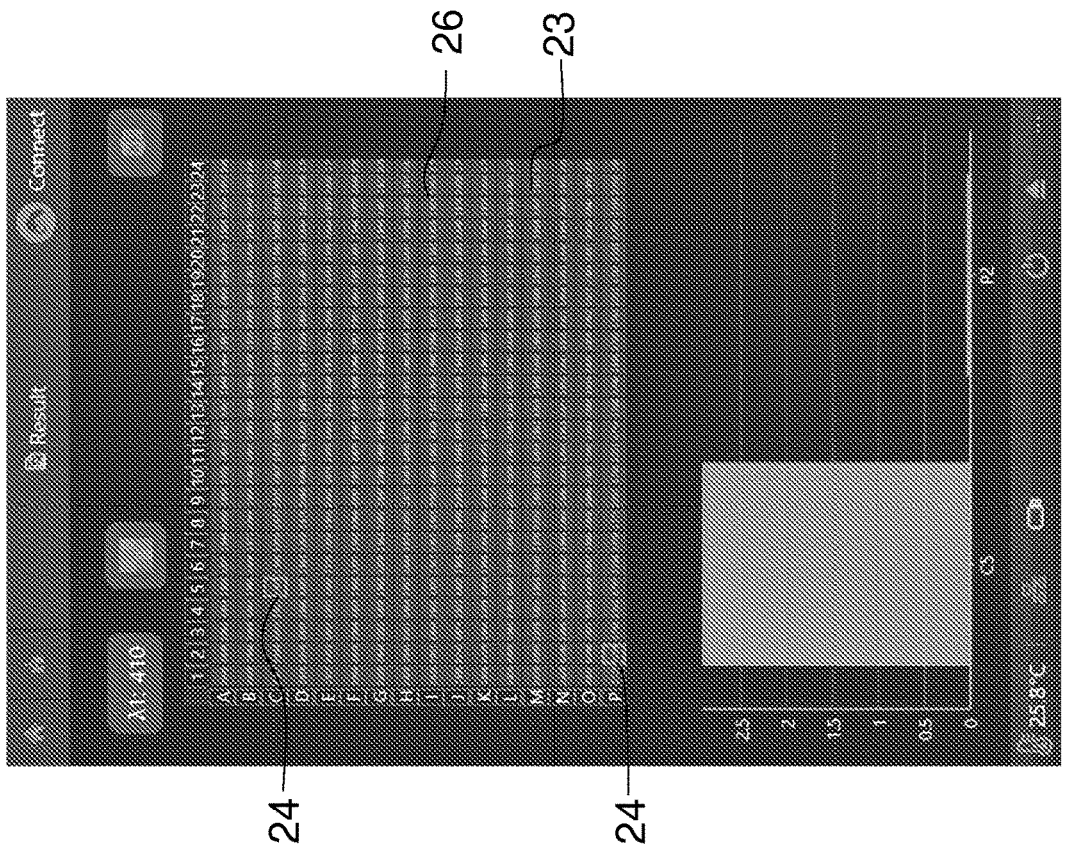

The result views of FIGS. 10*a* and 10*b* are similar to the views of FIGS. 5*a* and 5*b*. However, in this case the microplate 1 comprises 384 wells 2. Also in the examples of FIGS. 10*a* and 10*b*, the cells 23 with the highest and lowest absorbance values are automatically highlighted by surrounding the cells 23 with a frame 24. The difference between the numerical view of FIG. 10*a* and the heat map view of FIG. 10*b* clearly shows benefits of the invention. In the numerical view, the user can hardly distinguish anything. In the heat map view, the user can immediately see whether the assay has worked as expected. In this example, cells A2 to I2 are positive controls and cells J2 to P2 are negative controls. The colors of those cells show that the assay has worked properly. The user can also identify hits that are sufficiently different from the positive controls. The hits are shown with a different color and can be chosen for follow-up studies. An additional data analysis is not needed. The method and the microplate reader according to the invention thus improve the reliability and speed of the analysis.

According to the invention, the wavelength that has been set for the absorbance measurements is used as an input for determining the visual properties of the cells 23. The color of each cell 23 in the heat map is selected so that the color corresponds to the color of the sample 3 as perceived by the human eye. The color of each cell 23 is thus selected to be the complementary color of the color corresponding to the wavelength set for the absorbance measurements.

Figure 6:
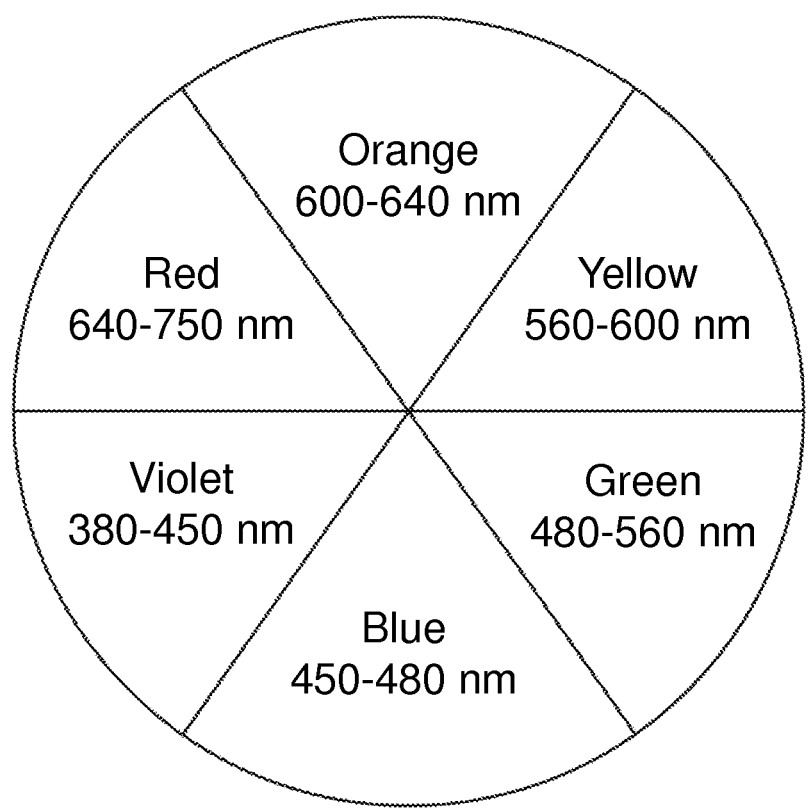
FIG. 6 shows a diagram for determining the colors used for visualizing measured absorbance values.

FIG. 6 shows an exemplary and simplified diagram illustrating the selection of the color of the cells 23. The diagram of FIG. 6 comprises six sectors, which represent different wavelength ranges of visible light (the main colors of a color wheel). When the microplate reader 10 is operated in the wavelength range of visible light, the wavelength set for the wavelength measurements 3 falls within one of the six ranges of FIG. 6. The set wavelength is typically close to a local absorbance maximum. The samples 3 thus absorb light with that wavelength. As a result, the color of the samples 3 as perceived by the user is thus the complementary color of the color corresponding to the wavelength set for the absorbance measurements. Complementary colors are located in the diagram of FIG. 6 in opposite sectors. The color used in the cells 23 of the matrix is thus selected from a sector that is located opposite to the sector comprising the wavelength that has been set for the absorbance measurements. As an example, if the set wavelength is 460 nm as shown in FIGS. 5*a* and 5*b*, i.e. the light used for illuminating the samples 3 is blue, the cells 23 of the result matrix are shown as orange. In the method according to the invention, the result matrix reflects the visual color of the samples 3 as seen by naked eye. This makes reading of the results more intuitive to the users, who are used to handling colored samples, and also more reliable, because process errors can be spotted at the same time. According to an embodiment of the invention, the color space used is preferably RGB or ARGB, preferably comprising 8 bits in all three color channels with values of 0-255, but also other suitable numbers of colors and color profiles may be utilized.

The absorbance values of the samples 3 are visualized by the color intensity of the cells 23. The color intensity or actually the transparency or translucency of each cell 23 is thus determined on the basis of the determined absorbance value of the respective sample 3. In computer graphics changing the transparency of a color without affecting its hue is generally accomplished by alpha blending. It is a process that blends the foreground color with the background color which in this case is preferably black. The blended color is computed as a weighted average of the foreground and background colors and the foreground color has a value from 1 to 0.1. The alpha channel values, i.e. the values of the foreground color of the cells 23 have a positive correlation with the absorbance values. The higher the absorbance value of a cell 23 is, the higher alpha channel value it receives. The samples 3 with low absorbance values are thus shown in the result matrix as more transparent (less intensely colored) cells 23 than the samples 3 with high absorbance values.

When using RGB color space, reducing the saturation of the sample 3 color would ultimately lead to the color hue tint changing towards white, black or gray, depending on the color. This is because in RGB mode, which is an additive color mode, the hue of a color is affected by the individual values of the red, green and blue channels. In alpha blending the actual amount of the R, G and B values is not changed so the hue of the color is not affected.

In the examples of FIGS. 5*a* and 5*b*, two cells 23 of the result matrixes are bordered with a differently colored frame 24. The frames 24 are used for highlighting the cells 23 with the lowest and highest absorbance values and/or for indicating a selection of a cell 23 within the matrix. The color of the frame 24 is similar to the color that corresponds to the wavelength set for the absorbance measurements. The wavelength of the color can be for example within 20 nm of the wavelength set for the absorbance measurements. Preferably the color of the frame 24 corresponds to the set wavelength. The color of the frame 24 is thus the complementary color of the color of the cell 23, which makes the frame 24 easy to spot. The color of the borders 26 that are used for separating any unframed cells 23 from each other is any color other than the color of the frames 24 or the cells 23, for example black, white or dark grey. The same color is preferably used as a background color.

The method according to the invention is applied when the wavelength of the electromagnetic radiation is in the range of visible light. The microplate reader 10 could also be operated in the wavelength range of ultraviolet and/or infrared light. In case the wavelength of the electromagnetic radiation is in the wavelength range of ultraviolet or infrared light, the cells 23 can be shown in a predetermined color. The color of the cells 23 can be for example black or white.

According to an embodiment of the invention, the user can manually change the color hue used in the visualization of the results to better match it with the actual visual image of the samples 3. For instance some samples 3 may comprise multiple absorption peaks even though only one of them is used for the absorption value determination. In such cases the actual visual color of a sample 3 might not correspond to the color corresponding to the wavelength of the absorption maximum of the samples 3.

Figure 7:
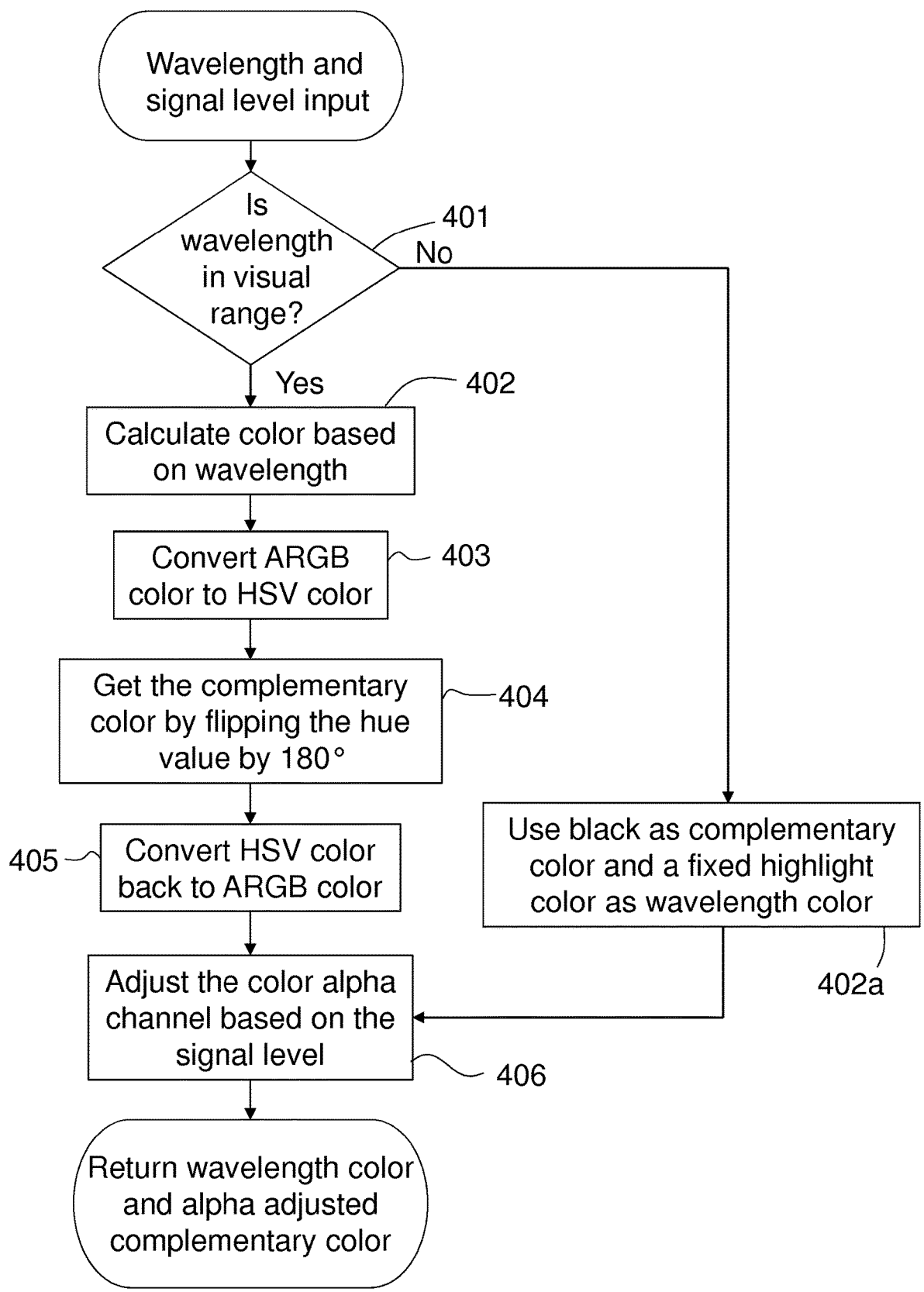
FIG. 7 shows as a flowchart an example of the steps for determining colors of a result matrix.

FIG. 7 shows as a flow chart an example of the steps for determining the visual properties of the cells 23 of a result matrix. In the example of FIG. 7, absorbance values of samples 3 are determined. A wavelength of the electromagnetic radiation used for illuminating the samples 3 is used as an input for the method. Another input is a signal level, which corresponds to an absorbance value of a sample. In a first step 401 of the method, it is determined whether the wavelength is in the wavelength range of visible light. If the wavelength is in the wavelength range of visible light, the color of the light is calculated based on the wavelength 402. In the next step, the calculated RGB or ARGB color is converted to an HSV color 403. In a fourth step, complementary color is determined by flipping the hue value of the HSV color by 180 degrees 404. The obtained HSV color is converted back to an ARGB color 405. The alpha channel of the color is adjusted based on the signal level 406. The method returns a wavelength color and an alpha adjusted complementary color. The wavelength color can be used as the color of a highlighting frame 24. In case the wavelength of the electromagnetic radiation used for illuminating the samples is outside the wavelength range of visible light, the steps 402-405 for determining the complementary color are omitted. Instead, black is used as a complementary color and a predetermined highlight color is used as the wavelength color 402*a*.

Figure 8:
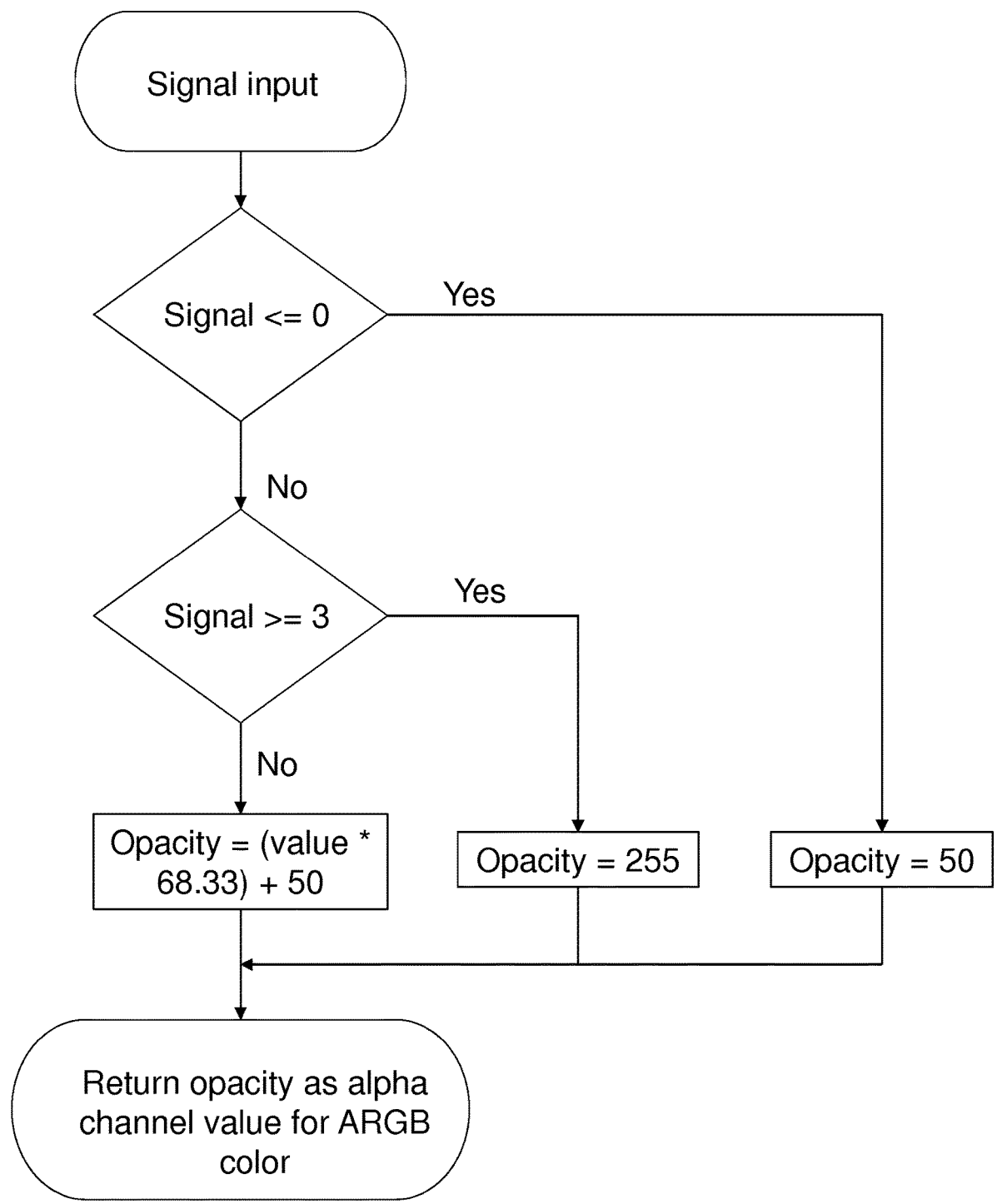
FIG. 8 shows an example of the steps for determining transparencies of the cells of a result matrix.

FIG. 8 shows an example of the steps of determining the transparency or opacity of the cells 23 of a result matrix. In the example of FIG. 8, if the value of the signal, which is in the case of absorbance measurements the absorbance value, is below zero, an opacity value of 50 is given to the cell 23. If the signal is above 3, an opacity value of 255 is given to the cell 23. For signal values between 0 and 3, the opacity value is calculated by equation opacity=signal value*68.33+ 50.

Figure 9:
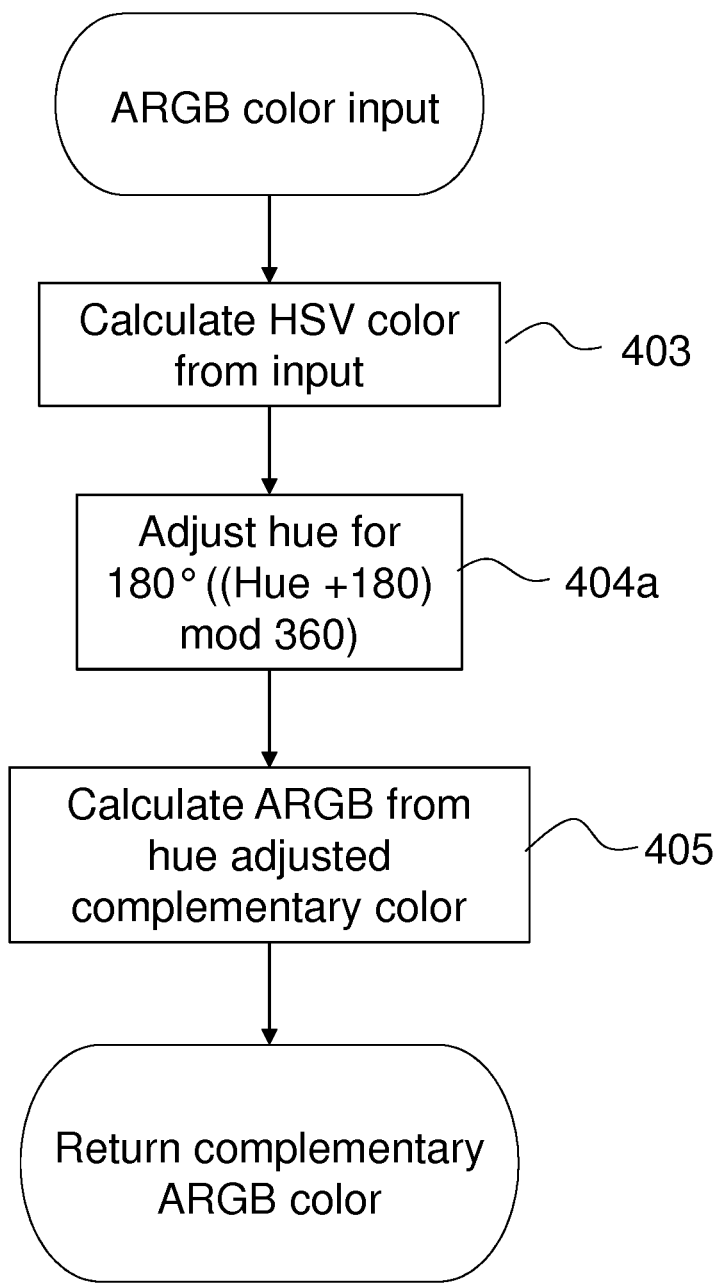
FIG. 9 shows the steps of determining the complementary color for a color having hue of 180°.

FIG. 9 shows a modified version of part of the method of FIG. 7. If the hue of the HSV color used as an input for determining the complementary color is 180, the step 404 of determining the complementary color is modified. In the modified step 404*a* the hue value is adjusted by 180 degrees and then modulo operation is performed on the adjusted value.

The method and microplate reader 10 according to the invention can also be used for kinetic studies of samples 3. In kinetic studies the step of absorbance measurement is repeated in set time intervals. Usually changes in absorbance values at a specific wavelength or wavelength range are monitored at a time. According to an embodiment of the invention, the visualization in the form of heat maps can also be applied to monitoring kinetic absorbance studies. The microplate reader 10 and/or an external computer can thus record and save the measurement data and show the result matrixes consecutively in real-time. The saved data can also be displayed later on. The user can thus visually monitor changes in the samples 3 via the cell color changes in the matrix as a time-resolved heat map.

Absorbance measurements can also be carried out using two or more different wavelengths. The step of setting the wavelength 101 can thus comprise setting of two or more wavelengths. Also the following steps of illuminating the samples 102, determining radiant fluxes 103, determining absorbance values 104 and visualizing the absorbance values 105 can comprise two or more phases. The results of separate measurements can be shown as separate heat maps. The user of the microplate reader 10 can switch between different views for showing the desired result matrix.

It will be appreciated by a person skilled in the art that the invention is not limited to the embodiments described above, but may vary within the scope of the appended claims. For instance, a spectrophotometer has been described above, but the microplate reader could also be a multimode reader, which can utilize also other detection technologies.

The invention claimed is:

1. A method of analyzing absorbance of one or more liquid samples arranged in the wells of a microplate, the method comprising the steps of:

setting a desired wavelength falling within the wavelength range of 380 nm 750 nm for absorbance measurement, the desired wavelength corresponding to a measurement color;

illuminating the samples using electromagnetic radiation having a bandwidth of at most 20 nm around the set wavelength;

measuring radiant flux transmitted through each sample to determine a set of measured radiant flux values;

on the basis of the measured radiant flux values, determining an absorbance value for each sample; and visualizing the absorbance values on a display as a matrix comprising a plurality of cells, each cell corresponding to a well of the microplate, wherein the set wavelength is used as an input for determining the color of the cells such that the color of each cell is selected to be the complementary color of the measurement color, and wherein the determined absorbance value of each sample is used as an input for determining the transparency of the respective cell on the display.

2. The method according to claim 1, wherein the color is selected from an RGB or ARGB color space.

3. The method according to claim 1, wherein the bandwidth of the electromagnetic radiation used for illuminating the samples is at most 10 nm.

4. The method according to claim 1, wherein the set wavelength is within 20 nm from a local absorbance maximum of the sample.

5. The method according to claim 4, wherein the set wavelength corresponds to the local absorbance maximum.

6. The method according to claim 1, wherein the method comprises the step of determining a local absorbance maximum of a sample, and the wavelength is set on the basis of the determined local absorbance maximum.

7. The method according to claim 6, wherein the local absorbance maximum is determined by illuminating at least one sample using electromagnetic radiation with different wavelengths or wavelength ranges, measuring radiant fluxes transmitted through the sample, and determining absorbance values for different wavelengths or wavelength ranges.

8. The method according to claim 1, wherein the transparencies of the cells are set by means of alpha blending and the alpha channel values of the cells have a positive correlation with the absorbance values.

9. The method according to claim 1, wherein at least one cell is bordered with a frame having a color corresponding to a wavelength, which is within 20 nm of the set wavelength.

10. The method according to claim 1, wherein two or more absorbance measurements are carried out at predetermined time intervals and the measurement data is shown in a time-resolved heat map view.

11. A microplate reader configured to implement the method according to claim 1.

12. The microplate reader according to claim 11, which comprises input means for allowing a user to manually change the color hue used in the visualization of the absorbance values to better match the visualization with the actual visual image of the samples.

13. The method according to claim 1, wherein the bandwidth of the electromagnetic radiation used for illuminating the samples is at most 2.5 nm.

14. The method according to claim 1, wherein the set wavelength is within 10 nm from a local absorbance maximum of the sample.

15. The method according to claim 1, wherein the set wavelength is within 2.5 nm from a local absorbance maximum of the sample.

\* \* \* \* \*